United States Patent
Oprescu-Surcobe et al.

(10) Patent No.: US 7,570,975 B2
(45) Date of Patent: Aug. 4, 2009

(54) METHOD AND APPARATUS FOR MANAGEMENT OF LOW-BATTERY MOBILE STATIONS

(75) Inventors: Valentin Oprescu-Surcobe, Northbrook, IL (US); Stanley J. Benes, Round Lake Beach, IL (US); John M. Harris, Chicago, IL (US); Sean S. Kelley, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 140 days.

(21) Appl. No.: 11/552,152

(22) Filed: Oct. 24, 2006

(65) Prior Publication Data

US 2007/0091836 A1    Apr. 26, 2007

Related U.S. Application Data

(60) Provisional application No. 60/730,411, filed on Oct. 26, 2005.

(51) Int. Cl.
*H04B 1/38*     (2006.01)
*H04M 1/00*     (2006.01)

(52) U.S. Cl. ............... 455/574; 455/127.1; 455/343.2; 455/343.5; 340/7.32

(58) Field of Classification Search ............ 455/127.1, 455/70, 572–574, 343.1, 343.5, 404.1, 343.2, 455/69, 412.2; 340/7.32, 7.33, 7.35, 7.22, 340/7.37, 7.41
See application file for complete search history.

(56) References Cited

U.S. PATENT DOCUMENTS

| | | | | |
|---|---|---|---|---|
| 5,155,428 | A * | 10/1992 | Kang | 320/136 |
| 5,915,210 | A | 6/1999 | Cameron et al. | |
| 6,275,712 | B1 * | 8/2001 | Gray et al. | 455/522 |
| 6,487,425 | B1 * | 11/2002 | Thakker et al. | 455/574 |
| 6,697,617 | B2 * | 2/2004 | Liebenow | 455/425 |
| 6,832,259 | B2 * | 12/2004 | Hymel et al. | 709/229 |
| 6,999,799 | B1 * | 2/2006 | Almassy | 455/574 |
| 7,142,895 | B2 * | 11/2006 | Heatley | 455/574 |
| 7,224,937 | B2 * | 5/2007 | Cheng | 455/39 |
| 2004/0113590 | A1 * | 6/2004 | Rosenquist et al. | 320/132 |
| 2006/0121951 | A1 * | 6/2006 | Perdomo et al. | 455/572 |
| 2006/0172721 | A1 * | 8/2006 | Dawson et al. | 455/405 |
| 2007/0073585 | A1 * | 3/2007 | Apple et al. | 705/14 |
| 2007/0120959 | A1 * | 5/2007 | Wu et al. | 348/14.02 |

* cited by examiner

*Primary Examiner*—Sujatha Sharma
*Assistant Examiner*—Matthew D. Anderson
(74) *Attorney, Agent, or Firm*—Steven A. May

(57) ABSTRACT

A communication system provides network-based battery power management that may be transparent to a user of a mobile station (MS). When one or more elements of a network of the communication system determines that the MS is operating at a low power supply charge level and/or has experienced a significant change in a charging level of the power supply, the one or more network elements may arrange for postponement of delivery of a delay-tolerant service to the MS or for adjustment of one or more of a characteristic of a service provided to the MS and a parameter of a radio communication with the MS, including restoration of full services to an MS whose power supply charge level has been restored.

17 Claims, 6 Drawing Sheets

METHOD AND APPARATUS FOR MANAGEMENT OF LOW-BATTERY MOBILE STATIONS

CROSS-REFERENCE TO RELATED APPLICATION

This application claims priority from provisional application Ser. No. 60/730,411, entitled "METHOD AND APPARATUS FOR MANAGEMENT OF LOW-BATTERY MOBILE STATIONS," and filed Oct. 26, 2005, which is commonly owned and incorporated herein by reference in its entirety.

FIELD OF THE INVENTION

The present invention relates generally to wireless communication systems, and, in particular, to management of low-battery mobile stations in a cellular communication system.

BACKGROUND OF THE INVENTION

Conservation of battery power has long been an important consideration in the design of wireless devices. Battery life and the frequent need to recharge a battery are among the most important features considered by consumers when selecting a cellular telephone. However, rapid battery depletion is an ever increasing problem due, in part, to the fact that the market demands ergonomically attractive cellular telephones that typically require small batteries. In addition, popular cellular telephone capabilities like large screens and high processing power can quickly result in a depleted battery. A service that especially can be affected by the issue of low battery charge levels is a Push-to-Talk service (PTT) because it may use a reduced slot cycle index on the paging channel to lower the latency of received calls. Monitoring the paging channel often translates directly to lower battery life.

To-date, battery management is done on a wireless device and by the wireless device. That is, cellular telephones have battery charge level indicators that indicate a charge level of the telephone. When a user of the telephone observes that the charge level is low, the user may engage in one or more activities to reduce the power drain on the battery, such as reducing a volume of a ring tone or choosing not to answer particular calls based on a caller identifier (caller-id). However, such user-implemented battery power conservation techniques are very primitive, require manual implementation by the user, and do not eliminate the need for further techniques of battery power conservation.

Therefore, a need exist for a method and apparatus that provides for battery power management and that may be transparent to a user of a cellular telephone.

Figure 1:
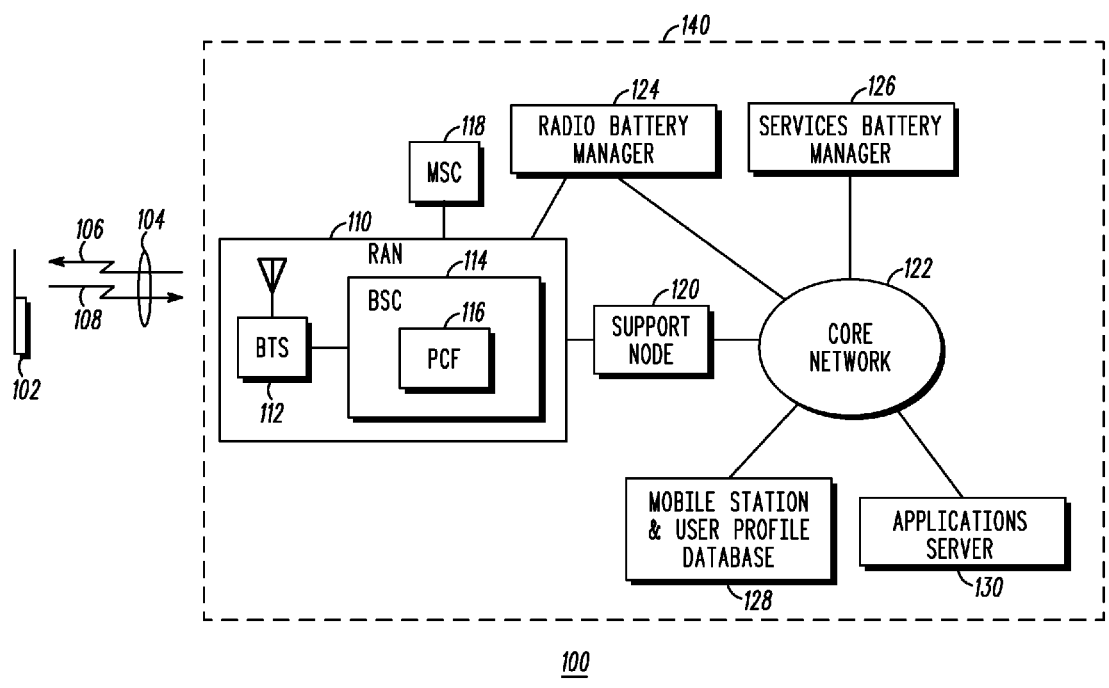
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus that provides for battery power management and that may be transparent to a user of a cellular telephone, a communication system provides network-based battery power management that may be transparent to a user of a mobile station (MS). When one or more elements of a network of the communication system determines that the MS is operating at a low power supply charge level and/or has experienced a significant change in a charging level of the power supply, the one or more network elements may arrange for postponement of delivery of a delay-tolerant service to the MS or for adjustment of one or more of a characteristic of a service provided to the MS and a parameter of a radio communication with the MS including restoration of full services to an MS whose power supply charge level has been restored.

Generally, an embodiment of the present invention encompasses a method for managing a charge level of a power supply of a mobile station. The method includes determining, by a network element, that the mobile station is operating at a low power supply charge level and, in response to the determination, adjusting one or more of a characteristic of a service provided to the mobile station and a parameter of a radio communication with the mobile station.

Another embodiment of the present invention encompasses a method for managing a charge level of a power supply of a mobile station. The method includes determining, by a network element, that the mobile station is operating at a low power supply charge level and, in response to the determination, postponing delivery of a delay-tolerant service to the mobile station.

Yet another embodiment of the present invention encompasses a method for managing a charge level of a power supply of a mobile station. The method includes detecting transitions to one or more of low levels of battery charging and high levels of battery charging and, in response to detecting the transition, notifying a network of the transition via over-the-air signaling.

Still another embodiment of the present invention encompasses a Services Battery Manager that resides in a telecommunications network and is configured to determine that a mobile station is operating at a low power supply charge level and, in response to the determination, perform one or more of adjusting a characteristic of a service being delivered to the mobile station and postponing a service being delivered to the mobile station.

Yet another embodiment of the present invention encompasses a Radio Battery Manager that resides in a Radio Access portion of a telecommunications network and is configured to determine that a mobile station is operating at a low power supply charge level and, in response to the determination, adjust a parameter of a radio frequency communication with the mobile station.

Still another embodiment of the present invention encompasses a mobile station that detects transitions to one or more of low levels of power supply charging and high levels of power supply charging and, in response to detecting the transition, notifies a network of the transition via over-the-air signaling.

The present invention may be more fully described with reference to FIGS. 1-8. FIG. 1 is a block diagram of a wireless communication system 100 in accordance with an embodiment of the present invention. Communication system 100 includes a Radio Access Network (RAN) 110 that provides wireless communication services to mobile stations (MS), or User Equipment (UE) or Access Terminal (AT), residing in a coverage area of the RAN. RAN 110 includes a Base Transceiver Station (BTS), Node B or Access Point, 112 that is operably coupled to a Base Station Controller (BSC), Radio Network Controller or Access Point Controller 114. BSC 114 includes a Packet Control Function (PCF) 116 that is implemented with or in software programs and instructions stored in an at least one memory device of the BSC and executed by a processor of the BSC. However, in another embodiment of the present invention, PCF 116 may be implemented in a network element external to, and in communication with, the corresponding BSC, in which event the functionality of the PCF may be implemented with or in software programs and instructions stored in an at least one memory device and executed by a processor of the network element.

RAN 110 is operably coupled to each of a support node 120, a Mobile Switching Center (MSC) 118, a Radio Battery Manager 124, and a Services Battery Manager 126. Support node 120 may comprise a Packet Data Service Node (PDSN), a Serving GPRS Support Node (SGSN), or a combination of one or more PDSNs and/or SGSNs. Each of support node 120, Radio Battery Manager 124, and Services Battery Manager 126 is further coupled to an Internet Protocol (IP) core network 122, and via the core network, to a Mobile Station and User Profile database 128 and an applications server 130. Core network 122 may comprise IS-41 and MAP-based cores, as well as IP Multimedia System (IMS) and Multimedia Domain (MMD). Together, RAN 110, MSC 118, support node 120, core network 122, Radio Battery Manager 124, Services Battery Manager 126, Mobile Station and User Profile database 128, and applications server 130 are collectively referred to herein as a telecommunications network 140 and thus each comprises one or more elements of network 140.

Mobile Station and User Profile database 128 maintains a record of a mobile identifier (mobile ID) associated with each MS subscribed to the services of communication system 100 and/or and active in the communication system and further maintains and tracks delivery and mobility information with respect to each such MS, including registration of the MS when the MS activates in communication system 100. Mobile Station and User Profile database 128 may be implemented in a Home Location Register (HLR) or a Visited Location Register (VLR) as known in the art, a combination of a HLR and a VLR, a combination of one or more HLRs and/or VLRs, and/or in one or more Authentication, Authorization and Accounting (AAA) servers or Home Subscriber Servers (HSS), and/or in one or several databases associated with application servers (AS). Among the information maintained in Mobile Station and User Profile database 128 are one or more profiles associated with each such MS, including services subscribed to and/or supported by the MS and/or an associated user, the capabilities of the MS, and the MS-type of the MS. Each profile of the one or more profiles associated with an MS may further be associated with a designated power supply charge level of the MS and may identify services that may be delivered to the MS when the MS is operating at the designated power supply charge level and/or requirements or characteristics of such services. For example, a profile associated with a lower power supply charge level may provide a reduced set of services or a reduced quality of service requirement or a reduction in other characteristics of a service (relative to a profile associated with a higher power supply charge level), which reductions result in a reduced amount of power that would otherwise be consumed by the MS in the course of continued operations. Each profile of the one or more profiles associated with an MS may further include an identifier of the profile, so that the MS need only convey the identifier to network 140 in order to request that the network utilize that particular profile in association with the MS. However, in another embodiment of the present invention, the one or more profiles associated with each MS subscribed to the services of communication system 100 and/or and active in the communication system and further associated with a designated power supply charge level may be maintained by one or more of Radio Battery Manager 124 and Services Battery Manager 126, and in particular in a memory device of the Radio Battery Manager or Services Battery Manager.

Figure 2:
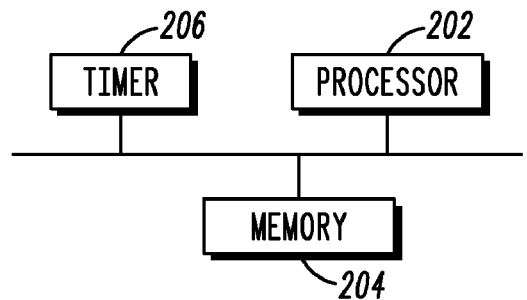
FIG. 2 is a block diagram of a radio battery manager of FIG. 1 in accordance with an embodiment of the present invention.

FIG. 2 is a block diagram of a Radio Battery Manager 124 in accordance with an embodiment of the present invention. Radio Battery Manager 124 includes a processor 202, such as one or more microprocessors, microcontrollers, digital signal processors (DSPs), combinations thereof or such other devices known to those having ordinary skill in the art. Radio Battery Manager 124 further includes at least one memory device 204 associated with processor 202, such as random access memory (RAM), dynamic random access memory (DRAM), and/or read only memory (ROM) or equivalents thereof, that store data and programs that may be executed by the processor and that allow the Radio Battery Manager to perform all functions necessary to operate in communication system 100. Radio Battery Manager 124 may further include a timer 206 coupled to processor 202, which timer counts a time period set by processor 202. In the preferred embodiment, the Radio Battery Manger is integral part of RAN 110 and is implemented as software programs that control allocations of resources.

Figure 3:
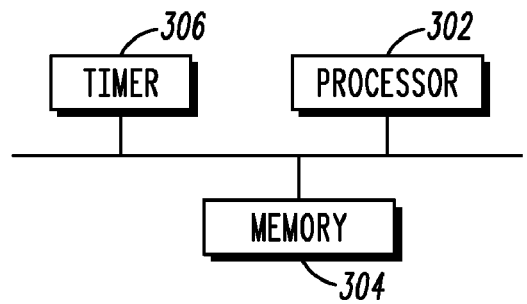
FIG. 3 is a block diagram of a services battery manager of FIG. 1 in accordance with an embodiment of the present invention.

FIG. 3 is a block diagram of a Services Battery Manager 126 in accordance with an embodiment of the present invention. Services Battery Manager 126 includes a processor 302, such as one or more microprocessors, microcontrollers, digital signal processors (DSPs), combinations thereof or such other devices known to those having ordinary skill in the art. Services Battery Manager 126 further includes at least one memory device 304 associated with processor 302, such as random access memory (RAM), dynamic random access memory (DRAM), and/or read only memory (ROM) or equivalents thereof, that store data and programs that may be executed by the processor and that allow the Services Battery Manager to perform all functions necessary to operate in communication system 100. Services Battery Manager 124 may further include a timer 306 coupled to processor 302, which timer counts a time period set by processor 302.

Although Radio Battery Manager 124 and Services Battery Manager 126 are depicted in FIG. 1 as separate elements of network 140, Radio Battery Manager 124 preferably is implemented in RAN 110 and is implemented as software programs that control allocations of resources and that are executed by a processor of the RAN and stored in an at least one memory device of the RAN, and Services Battery Manager 126 preferably is implemented in an element of core network 122 or in applications server 130, and more particularly is implemented as software programs that are executed by a processor of the core network element or applications server and are stored in a corresponding at least one memory device of the core network element or applications server. However, in other embodiments of the present invention, Radio Battery Manager 124 and Services Battery Manager 126 may comprise a separate element of network 140, as depicted by FIG. 1, or various functions attributed herein to Radio Battery Manager 124 may be performed by MSC 118, support node 120, core network 122, or applications server 130, or may be distributed among two or more of RAN 110 and such network elements, and various functions attributed herein to Services Battery Manager 126 may be performed by RAN 110, MSC 118, or support node 120, or may be distributed among two or more of the RAN, MSC, support node, core network, and applications server. Further, various functions of Radio Battery Manager 124 and Services Battery Manager 126 that are performed by RAN 110 may be performed by any one or more of BTS 112, BSC 114, and PCF 116, and more particularly by a processor of the BTS, BSC, and PCF, based on software programs and instructions stored in a corresponding at least one memory device of the BTS, BSC, and PCF, or may be distributed among two or more of the BTS, BSC, and PCF.

Communication system 100 further comprises at least one mobile station (MS) 102, such as but not limited to a cellular phone, a radiotelephone, or a wireless communication-enabled personal computer, laptop computer, or personal digital assistant (PDA), that resides in a coverage area of RAN 110. RAN 110 provides communications services to MS 102 via an air interface 104 that includes a forward link 106 and a reverse link 108. Forward link 106 includes including at least one forward link traffic channel, multiple forward link control channels including a forward link common control channel and a forward dedicated control channel, a broadcast channel, and a paging channel. Reverse link 108 includes at least one reverse link traffic channel, at least one reverse link control channel, and an access channel.

Figure 4:
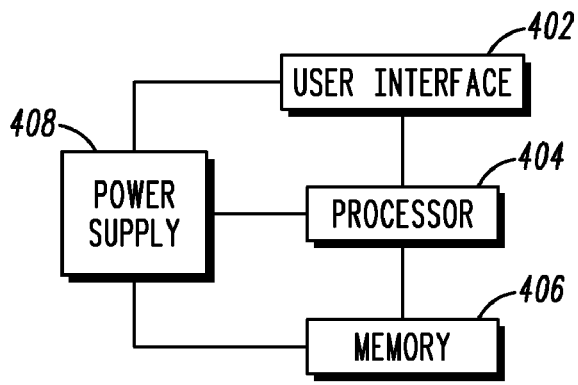
FIG. 4 is a block diagram of a mobile station of FIG. 1 in accordance with an embodiment of the present invention.

FIG. 4 is a block diagram of MS 102 in accordance with an embodiment of the present invention. MS 102 includes a user interface 402 coupled to a processor 404, such as one or more microprocessors, microcontrollers, digital signal processors (DSPs), combinations thereof or such other devices known to those having ordinary skill in the art. User interface 402 provides a user of the MS with the capability of interacting with the MS, including inputting instructions into the MS. In one embodiment of the present invention, user interface 402 may include a display screen and a keypad that includes multiple keys, including a Push-to-Talk (PTT) key, that may be used by a user of the MS to input instructions into the MS. In another embodiment of the present invention, the display screen may comprise a touch screen. MS 102 further includes an at least one memory device 406 associated with processor 404, such as random access memory (RAM), dynamic random access memory (DRAM), and/or read only memory (ROM) or equivalents thereof, that maintain data and programs that may be executed by the processor and that allow the MS to perform all functions necessary to operate in communication system 100. The at least one memory device 406 may further maintain one or more profiles of the MS, which one or more profiles are each associated with a designated power supply charge level of the MS. The profiles may or may not correspond to one or more profiles of the MS maintained by Mobile Station and User Profile database 128. Each profile of the one or more profiles of the MS may identify services that may be provided to the MS when the MS is operating at the designated power supply charge level and/or requirements or characteristics of such services. For example, a profile associated with a lower power supply charge level may provide a reduced set of services or a reduced quality of service requirement or a reduction in other characteristics of a service, which reductions (relative to a profile associated with a higher power supply charge level) result in a reduced amount of power that would otherwise be consumed by the MS in the course of continued operations. Each profile of the one or more profiles may further include an identifier of the profile, so that the MS need only convey the identifier to network 140 in order to request that the network utilize that particular profile in association with the MS. MS 102 further includes a limited-life power supply 408, such as a battery that may be removable or permanently-affixed and that may or may not be rechargeable, that provides power to each of user interface 402, processor 404, and at least one memory device 406 enabling each such component of the MS to operate in communication system 100.

The embodiments of the present invention preferably are implemented within each of MS 102, Radio Battery Manager 124, and Services Battery Manager 126, with or in software programs and instructions stored in the at least one memory devices and executed by the processors of the MS, Radio Battery Manager, and Services Battery Manager. However, one of ordinary skill in the art realizes that the embodiments of the present invention alternatively may be implemented in hardware, for example, integrated circuits (ICs), application specific integrated circuits (ASICs), and the like, such as ASICs implemented in the MS, Radio Battery Manager, and Services Battery Manager, and all references to 'means for' herein may refer to any such implementation of the present invention. Based on the present disclosure, one skilled in the art will be readily capable of producing and implementing such software and/or hardware without undo experimentation.

Preferably, communication system 100 is a CDMA (Code Division Multiple Access) 2000 communication system that operates in accordance with the 3GPP2 (Third Generation Partnership Project 2) standards. To ensure compatibility, radio system parameters and call processing procedures are specified by the standards, including call processing steps that are executed by an MS and a RAN serving the MS and between the RAN and associated infrastructure in order to establish a call or execute a handoff. However, those who are of ordinary skill in the art realize that communication system 100 may operate in accordance with any one of a variety of wireless communication systems, such as but not limited to IS-136, IS-95, or IS-833 communication systems, an iDEN® communication system, a Global System for Mobile Communications (GSM) communication system, a General Packet Radio Service (GPRS) communication system, a Universal Mobile Telecommunication System (UMTS) communication system, a Wireless Local Area Network (WLAN) communication system as described by the IEEE (Institute of Electrical and Electronics Engineers) 802.xx standards, for example, the 802.11, 802.15, 802.16, or 802.20 standards, or Fourth Generation (4G) communication systems such as an Orthogonal Frequency Division Multiple Access (OFDM) communication system.

Figure 5:
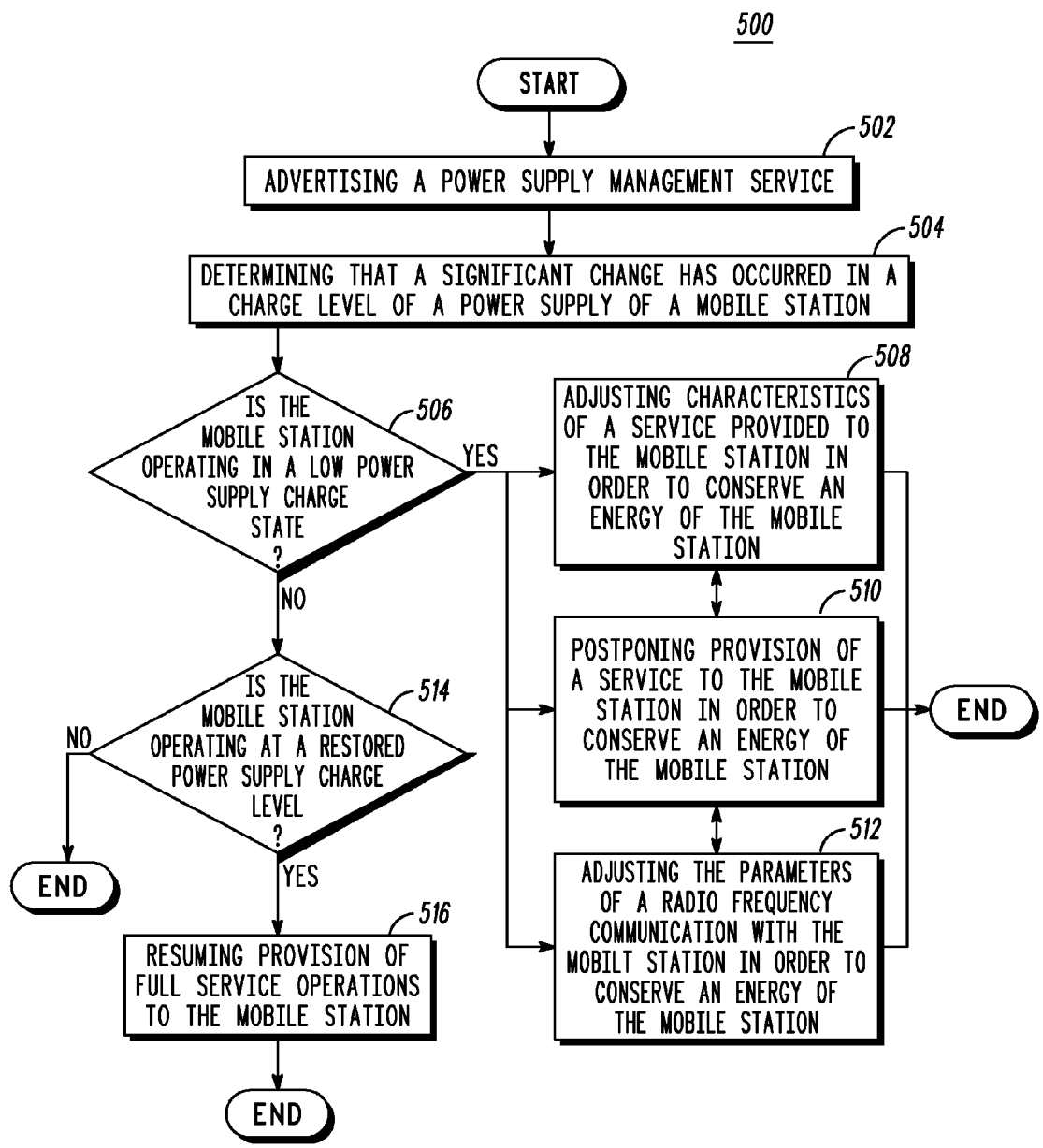
FIG. 5 is a logic flow diagram illustrating a management by a network of FIG. 1 of a mobile station of FIG. 1 having a power supply with a low charge level and/or that has experienced a significant change in a charging level of the power supply in accordance with various embodiments of the present invention.

Referring now to FIG. 5, a logic flow diagram 500 is provided that illustrates a management by network 140 of an MS having a power supply 408 with a low charge level and/or that has experienced a significant change in a charging level of the power supply in accordance with various embodiments of the present invention. Logic flow diagram 500 begins when network 140, and in particular one or more of Radio Battery Manager 124 and Services Battery Manager 126, advertises (502) a power supply management service to mobile stations (MSs) serviced by the system. In one embodiment of the present invention, network 140 may advertise the service by broadcasting information concerning the service via RAN 110. For example, network 140, and in particular RAN 110, may broadcast the information via the broadcast channel or a common control channel of forward link 106. In another embodiment of the present invention, network 140 may advertise the service by conveying information concerning the service to a particular MS, such as MS 102. For example, network 140 may convey the information to MS 102 via RAN 110 and a common control channel or a dedicated control channel when the MS registers with network 140 or may convey the information to MS 102 via RAN 110 and a dedicated channel such as a dedicated control channel or a traffic channel during a call involving the MS or at the end of the call before the traffic channel is torn down. In another embodiment of the present invention, neither the Radio Battery Manager nor the Services Battery may advertise and the MS may assume that the Radio Battery Manager and the Services Battery are available and proceed accordingly. If the assumption turns out to be incorrect, the requests from the MS may be ignored or the MS may discover the unavailability of the Radio Battery Manager and/or the Services Battery based on rejection messages.

In advertising the power supply management service, network 140, and in particular one or more of Radio Battery Manager 124 and Services Battery Manager 126, conveys information concerning the power supply management service that may include one or more of a high power supply 408 charging level, that is, output power level, to be reported by an MS, a low power supply 408 charging level to be reported by an MS, radio frequency (RF) mode settings to be implemented by an MS in a low-charge state, and possible reverse link active set adjustments to be made by an MS in a low-charge state. Such information is maintained in one or more of the at least one memory device 204 of Radio Battery Manager 124 and the at least one memory device 304 Services Battery Manager 126. However, in other embodiments of the present invention, one or more of these items of information may not be conveyed by Radio Battery Manager 124 and Services Battery Manager 126 to MS 102 until the MS reports that the MS is in a low charge state. In response to receiving the power supply management service information, MS 102 stores the information in the at least one memory device 406 of the MS.

When a charging level of power supply 408 of an MS, such as MS 102, undergoes a significant change, network 140, and in particular one or more of Radio Battery Manager 124 and Services Battery Manager 126, determines (504) that a significant change has occurred in the charging level of power supply 408 of the MS. For example, Radio Battery Manager 124 and/or Services Battery Manager 126 may determine that MS 102 is now operating (506) at a low power supply charge level or that MS 102 is now operating (514) at a restored power supply charge level. A significant change in a power supply charging level may comprise a change in an output power level of power supply 408 that exceeds an output power level change threshold or may comprise a decline in an output power level of power supply 408 to less than an output power level threshold; however, one of ordinary skill in the art realizes that other algorithms may be used for determining that a significant change has occurred in the charging level of power supply 408 of the MS and that such other algorithms may be used herein without departing from the spirit and scope of the present invention.

Figure 6:
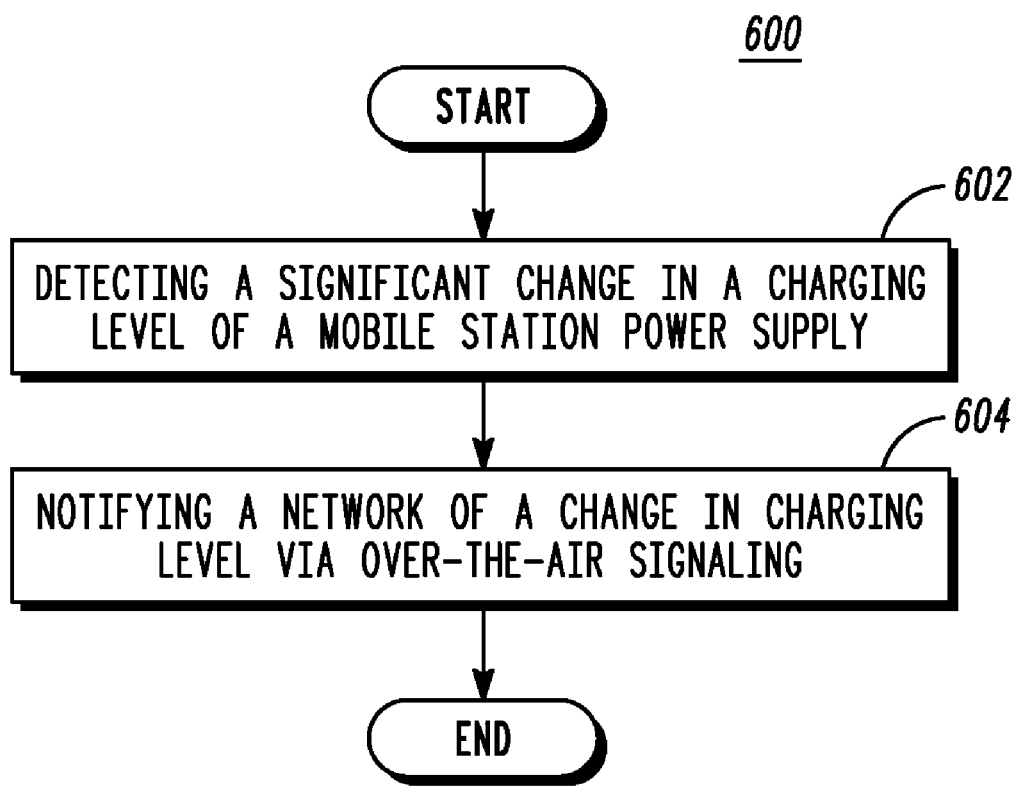
FIG. 6 is a logic flow diagram of a method executed by the mobile station of FIG. 1 in notifying the network of FIG. 1 of a change in a charging level of a power supply of the mobile station in accordance with an embodiment of the present invention.

In one embodiment of the invention, Radio Battery Manager 124 and/or Services Battery Manager 126 may determine that a significant change has occurred in the charging level of power supply 408 of MS 102 based on a message received from the MS. Referring now to FIG. 6, a logic flow diagram 600 is provided illustrating a method executed by MS 102 in notifying network 140 of a change in a charging level of a power supply 408 of the MS in accordance with an embodiment of the present invention. Logic flow 600 begins when the charging level of power supply 408 of MS 102 undergoes a significant change. MS 102 detects (602) the change, such as a transition to a low level of battery charging or to a high level of battery charging, and notifies (604) network 140 of the change via reverse link 108. Logic flow 600 then ends. MS 102 may notify network 140 of the change via information sent on a common channel of reverse link 108 or via information sent on a traffic channel of reverse link 108, which may be affecting only the call in progress or may stay in effect until an explicit change.

The notification may explicitly or implicitly identify the new charging level of the MS. For example, an explicit notification of the new charging level may comprise a message, such as an order message, conveyed to RAN 110 reporting the low charging level or providing a service profile associated with the new charging level. By way of another example, an implicit notification may comprise a message identifying a pre-stored charging level or a service profile that is associated with the new charging level and that is different from the service profile currently in use. For example, the message may identify one of multiple service profiles maintained by network 140 in association with the MS, such as a message requesting that the network change to a lower power supply charge profile of the MS. The identified service profile may be expressly identified by the MS, or the MS may convey an identifier associated with the service profile. By way of still another example, the notification may comprise an explicit or implicit notification that a charging level of the mobile station has been restored. Again, the notification may comprise an express notification of the new charging level or of a service profile associated with the new charging level, or may implicitly inform of the new charging level by identifying a service profile that is associated with the new charging level and that is different from the service profile currently in use.

In response to receiving the notification, RAN 110 conveys the received information to one or more of Radio Battery Manager 124 and Services Battery Manager 126. When the notification identifies a new service profile for use with respect to the MS, that is, MS 102, Radio Battery Manager 124 and/or Services Battery Manager 126 retrieves the identified service profile from Mobile Station and User Profile database 128 or from the at least one memory device 204, 304 of the Radio Battery Manager or Services Battery Manager. Upon retrieving the profile, the Radio Battery Manager 124 and/or Services Battery Manager 126 stores the retrieved profile (if the profile is not already maintained by the Radio Battery Manager or Services Battery Manager) and conveys to RAN 110 information from the profile that is used by the RAN to provide services to the MS, such as quality of service information and other service characteristics relevant to providing such services.

In another embodiment of the present invention, network 140 may self-determine that MS 102 has undergone a significant change in a charging level, for example, is operating in a low power supply charge state. In one such embodiment of the present invention, network 140 may self-determine that MS 102 has undergone a significant change in a charging level by reference to one or more of timers 206 and 306. That is, one or more of timers 206 and 306 may be set to a value mutually agreed-upon by MS 102 and Radio Battery Manager 124 and Services Battery Manager 126, respectively, and upon an expiration of the timer, network 140, and in particular RF Battery Manager 124 and/or Services Battery Manager 126, may assume that the MS is operating in a low power supply charge state and thereby avoid a need for additional messaging at the time of expiration. That is, timers 206 and/or 306 may be set to a value corresponding to a time period during which power supply 408 of MS 102 is likely to undergo a significant change in a charging level. Thus an expiration of timers 206 and/or 306 may correspond to an indication that power supply 408 of MS 102 has undergone a significant change.

When MS 102 temporarily uses an alternative, wired power supply other than limited life power supply 408, the MS may report a fully charged power supply 408 to the infrastructure even if power supply 408 is not fully charged. Once MS 102 starts running only on power supply 408, the MS may re-notify the infrastructure of the MS's current battery charging level. Alternatively, the MS and power supply 408 can be placed in a power conservation mode when a human-powered power supply is used.

Network 140 may store information about a current charge level of power supply 408 of MS 102 in the at least one memory device 204, 304 of Radio Battery Manager 124 and/or Services Battery Manager 126, respectively. When such elements are implemented in other elements of network 140, network 140 may store information about a current charge level of power supply 408 of MS 102 at BSC 114 during an active call and at Mobile Station and User Profile Database 128 and/or in at least one memory device of any one or more of MSC 118, PCF 116, support node 120, and an Internet Server (not shown) coupled to IP network 122 during inactivity or dormancy. Further, profile information about how low battery situations are to be handled can be stored on MS-per-MS basis and in association with a profile of each such MS at Mobile Station and User Profile Database 128 and/or other subscriber registry elements (not shown) of network 140.

When the received notification indicates that MS 102 is operating in a low charge state, or when network 140 self-determines that the MS is operating in a low charge state, network 140, network 140, and in particular Services Battery Manager 126, may adjust (508) one or more characteristics of a service being delivered to the MS, which service adjustment results in a reduction in an amount of power that would otherwise be consumed by MS 102 in the course of continued operations. In accepting a service adjustment, it is assumed that the user of the MS, that is, MS 102, accepts or prefers a degraded or a postponed service as an alternative to no service at all due to an exhaustion of the power supply. Examples of service adjustments that reduce an amount of power required for continued operation of MS 102 include adjustments in a radio frequency (RF) link established between the MS and network 140, and more particularly in reverse link 108, thereby reducing an amount of power consumed by MS 102 in transmitting on the link, and adjustments in, or deferral of, signaling between MS 102 and network 103, thereby reducing an amount of power consumed by the MS when participating in such signaling.

For example, and merely for the purpose of illustrating service adjustments that may be made to conserve an energy of power supply 408 of MS 102 and not intending to provide a comprehensive list of such adjustments or to limit the scope of the invention in any way, Services Battery Manager 126 may do any one or more of lowering a Quality of Service (QoS) associated with a delivery of the service to MS 102, delaying a connection of incoming (voice) calls by alerting (including an identification of the caller (caller-id)) a user of a target mobile station on the common channels and actually connect the call only upon explicit acceptance of the call by the user of the target mobile station user and/or placing the originating MS, that is MS 102, in a semi-dormant state while awaiting a response from the target mobile station wherein a ring tone of the originating MS is disabled, reducing a quantity of message or call alerts being delivered to the MS, queuing and combining alerts and/or messages (for example, short message serviced (SMS) messages) so that they can be sent to the MS as a single, combined message, automatically directing calls intended for MS 102 to a voice mailbox associated with the MS instead of attempting to establish a call with MS 102 over air interface 104, speeding up voicemail playback when the user of MS 102 is on a voice channel of air interface 104 (so that the user can spend less time on the traffic channel), automatically reducing an amount of information being delivered to MS 102 with respect to voicemail messages for the MS, such as not reading out the timestamp of when the call was left or providing a reduced set of instructions for navigating the voice mail system, performing "content scaling" by lowering resolution and/or transmission rate (for example, by making adjustments in the operation of the coders), filtering non-essential information, and so on, replacing real-time voice with "voice messaging" (which voice message may be compressed), increasing an interval between updates for services that require periodic refreshing of information (for example, "presence"-enabled services), and redirecting the MS to a different (and preferably more efficient in terms of power consumption by the MS) network, telecommunication system, or technology such as selecting a different wireless technology, for example, a second generation technology such as CDMA or GSM, a third generation technology such as UMTS or CDMA 2000, or an 802.11, 802.16 or other 802.xx technology, or and/or a network that has access points closer in distance to the MS.

In another embodiment of the present invention, in response to determining that MS 102 is operating in a low power supply charge state and in addition to, or instead of, adjusting the characteristics of a service being delivered to the MS, Services Battery Manager 126 may postpone, that is, defer, (510) a delivery of a service to the MS. Preferably, such "service postponing" is executed in the core network and may be undertaken based on the MS's profile maintained in Mobile Station and User Profile database 128, such as the services subscribed to by the user of the MS. For example, network 140 may postpone a delivery of a Short Messaging Service (SMS) (or variants thereof such as an Enhanced Messaging Service (EMS) or a Multimedia Messaging Service (MMS)), and preferably such messages when not marked urgent or that do not come from a group of sources pre-designated as privileged to the MS, a delivery of push services (for example, advertising), a synchronization of a calendar, a schedule, and so on, a delivery of "To Go" services, such as daily news, weather, and so on, an upload of photographs, and preferably high-resolution photographs, a transfer of larger email attachments (that are not 'high priority'), a transfer of files for companies with no wire-line access or telemetry data, a transfer of voice messages or voice mail, a delivery of delay tolerant updates of mood/status/location presence information, a wireless download of 'free' games that are given to users, and an over-the-air provisioning of software updates to MSs such as MS 102. One of ordinary skill in the art realizes that any delay tolerant service may be postponed and the above list of services is provided merely for the purpose of illustrating services that may be postponed in order to conserve an energy of power supply 408 and is not intended to be a comprehensive list of such services or to limit the scope of the invention in any way.

Further, in still another embodiment of the present invention, MS-initiated services may be postponed or deferred by MS 102 without intervention by network 140 in that the MS may postpone initiating a transfer for the above services when it detects that it is in a low power supply power output state. If the power output of power supply 408 is low enough then the services may be postponed an indeterminate period of time. When the charge level of power supply 408 is a little better, then the services may be postponed until MS 102 is in better radio frequency (RF) conditions. By better RF conditions, the concern is primarily with the power drain of initiating a transfer at a given time rather than the cell load per se.

In yet another embodiment of the present invention, in response to determining that MS 102 is operating in a low power supply charge state and in addition to, or instead of, performing one or more of an adjustment of the characteristics of a service being delivered to the MS and a postponement of a delivery of a service to the MS, network 140, and in particular Radio Battery Manager 124, may adjust (512) one or more parameters of an RF communication to the MS. For example, and again merely for the purpose of illustrating adjustments that may be made to conserve an energy of power supply 408 and not intending to provide a comprehensive list of such adjustments or to limit the scope of the invention in any way, Radio Battery Manager 124 may be able to preserve an energy of power supply 408 of MS 102 by changing a technique for managing an active set of the MS, for example, by expanding an active set associated with reverse link 108 in order to limit a transmit power of MS 102, by operating the MS at a different forward error rate (FER) and/or with different retransmission parameters, such as dropping any retransmission requirements, by selecting a channel for further communications (for example, a fundamental channel versus a supplemental channel) with MS 102 based on an amount of power consumed for transmission over each such channel, by applying resource allocation strategies (for example, dormancy timers, supplemental channel time slots) that minimize power consumption by the MS (for example, at the expense of transfer speed or RF capacity), by controlling radio configuration and gating to minimize power consumption by the MS, and by prohibiting speculative behavior related to the MS, such as a setting up of a traffic channel in air interface 104 in anticipation of an origination of call by the MS or in anticipation of an acceptance of a call by a target MS. The Radio Battery Manager 124 behaviors may be, in general, dependent on a loading state of a cell serviced by the RAN serving MS 102 and/or on values of the strengths of pilot signals as reported by MSs serviced by the RAN, such as MS 102.

An implementation of any one or more of a service adjustment, a service postponement, and an RF communication adjustment by network 140 in response to a determination that MS 102 is operating in a low power supply charge state may further include considerations of a type of MS or a type of battery to which a power conservation strategy is being applied, as different types of MSs may consume more or less energy, that is, may use more or less electric current, in different circumstances. As a result, a profile of the MS, such as MS 102, maintained by network 140 at Mobile Station and User Profile database 128 and/or in Radio Battery Manager 124 or Services Battery Manager 126 may include profiles of the power consumption and battery characteristics the MS, or network 140 may maintain in the database profiles of the power consumption and battery characteristics each MS-type supported by the network. In addition, the implementation may take into consideration other information stored in the profile, such as specific services subscribed to by the mobile station, that is, by a user of the MS, and a level of service subscribed to by the MS. For example, an implementation of any one or more of a service adjustment, a service postponement, and an RF communication adjustment may be a service that has to be subscribed to by a user of the MS. Network 140, and in particular Radio Battery Manager 124 or Services Battery Manager 126, may then consult with such profiles when the network employs a power conservation strategy with respect to the MS.

When the received notification indicates that MS 102 is operating (514) at a restored power level, network 140, and in particular Services Battery Manager 126, may resume providing (516) full service operation to the MS, such as adjusting one or more characteristics of a service being delivered to the MS which service adjustment results in a resumption of full service operations to the MS. For example, network 140 may readjust any service adjustments or RF parameter adjustments that were made to conserve energy of power supply 408 of the MS or may resume delivery of any services that were postponed due to a low charge level of the MS.

Figure 7:
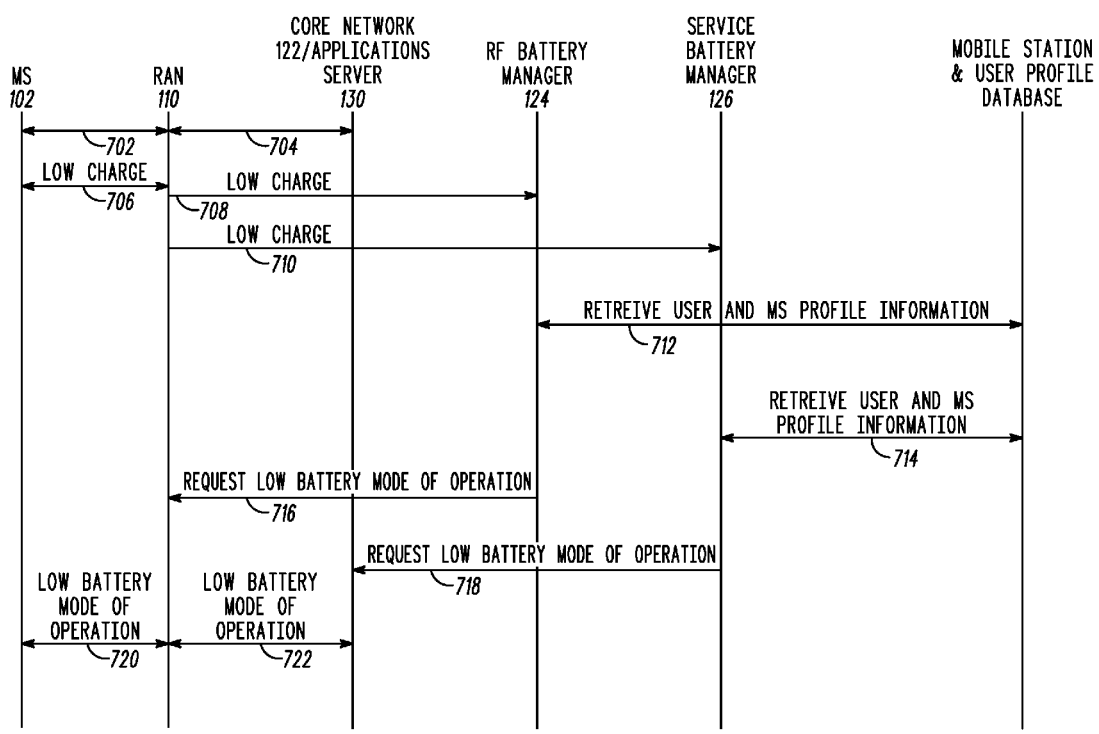
FIG. 7 is an exemplary call flow diagram illustrating a management by a network of FIG. 1 of a mobile station of FIG. 1 having a power supply with a low charge level in accordance with an embodiment of the present invention.

To further enable the reader to understand the operation of communication system 100, call flow diagrams are provided that further illustrate a management by network 140 of an MS having a power supply 408 with a low charge level in accordance with an embodiment of the present invention. FIG. 7 is an exemplary call flow diagram 700 that illustrates a management by network 140 of an MS having a power supply 408 with a low charge level in accordance with an embodiment of the present invention. Call flow diagram 700 begins when communication links (702, 704) are established between MS 102 and RAN 110, and, in association with the MS, between RAN 110 and core network 122. MS 102 then reports (706) that the MS is operating at a low battery charge level. As noted above, the report may be explicit or implicit. In response to receiving the report, RAN 110 notifies (708, 710) each of Radio Battery Manager 124 and Services Battery Manager 126 that MS 102 is operating at a low battery charge level. As noted above, this notification may be explicit or implicit. However, in another embodiment of the present invention, the Radio Battery Manager 124 and/or Services Battery Manager 126 may self-determine that MS 102 is operating at a low battery charge level.

In response to receiving the notification that MS 102 is operating at a low battery charge level, or to self-determining that the MS is operating at a low battery charge level, the notified Radio Battery Manager 124 and/or Services Battery Manager 126 retrieves (712, 714) from Mobile Station and User Profile database 128 information concerning an adjustment of the operation of the MS, services provided to the MS, and/or RF environment associated with the MS. For example, Mobile Station and User Profile database 128 may provide to the inquiring Radio Battery Manager 124 and/or Services Battery Manager 126 the type of MS 102, the services subscribed to by the MS/user, and and capabilities of the MS.

In response to retrieving the information from Mobile Station and User Profile database 128, Radio Battery Manager 124 may request (716) that RAN 110 switch to a low battery mode of operation with respect to MS 102, and the RAN may then engage (720) a low battery mode of operation with the MS. In addition, or in the alternative, in response to retrieving the information from Mobile Station and User Profile database 128, Services Battery Manager 126 may request (718) that one or more of core network 122 and applications server 130 switch to a low battery mode of operation with respect to MS 102 and the core network 122 and/or applications server 130 may then engage (720, 722) in a low battery mode of operation with respect to the MS.

Figure 8:
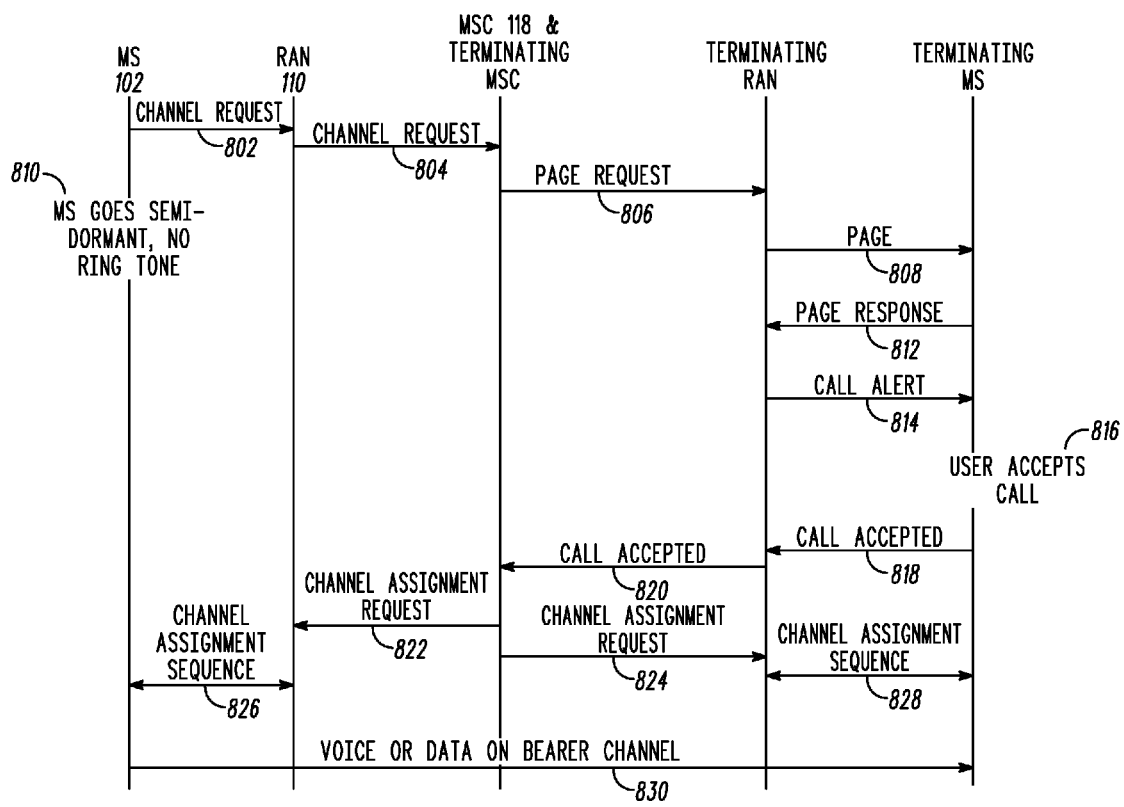
FIG. 8 is an exemplary call flow diagram illustrating a management by a network of FIG. 1 of a mobile station of FIG. 1 having a power supply with a low charge level in accordance with another embodiment of the present invention.

FIG. 8 is exemplary call flow diagram 800 that illustrates a management by network 140 of an MS having a power supply 408 with a low charge level in accordance with another embodiment of the present invention. Call flow diagram 800 begins when and originating MS, that is, MS 102, conveys (802) a request to originate a communication session to a RAN serving the MS, that is, RAN 110. The request identifies a target MS (not shown in FIG. 1). In response to receiving the request, RAN 110 conveys (804) a communication channel request to MSC 118. MSC 118 (and an MSC serving the target MS, if a different MSC) then arranges for a RAN serving the target MS, that is, a target RAN (not shown in FIG. 1), to page (806) the target MS, preferably by arranging for a PAGE REQUEST message to be sent to the target RAN. In response to receiving the page request, the target RAN pages (808) the target MS. Meanwhile, originating MS 102 enters (810) a semi-dormant state in a semi-dormant state while awaiting a response from the target mobile station and in which state a ring tone of the originating MS may be disabled, thereby conserving energy of power source 408 of MS 102.

In response to receiving the page, the target MS conveys (812) a page response to the target RAN. The target RAN then alerts (814) the target MS to a call for the MS, preferably by conveying a CALL ALERT message to the target MS that includes an identifier of originating MS 102, and the user of the target MS accepts (816) the call. The MSCs serving each of the target MS and originating MS 102 are each notified (818, 820) that the target MS has accepted the call and each MSC requests (822, 824) that the RAN serving the corresponding MS, that is, the target RAN with respect to the target MS and RAN 110 with respect to MS 102, assign a bearer channel to their corresponding MS for enablement of the communication session. In response to receiving their respective channel assignment request, RAN 110 establishes (826) a bearer channel with MS 102 and target RAN establishes (828) a bearer channel with the target MS. The MSs then may exchange (830) voice or data and call flow diagram 800 ends.

By providing one or more network elements, that is, a Radio Battery Manager 124 and/or a Services Battery Manager 126, that determine that an MS, such as MS 102, is operating at a low power supply charge level and/or has experienced a significant change in a charging level of a power supply 408, typically a limited life battery, of the MS and, in response to the determination, undertakes any one or more of multiple actions that will adjust a power consumption resulting from continued operation of the MS, communication system 100 provides a network-based battery power management service that may extend a life of the power supply and may be transparent to a user of the MS. The one or more network elements may self-determine that the MS is operating at a low power supply charge level and/or has experienced a significant change in a charging level of the power supply or may make such a determination based on signaling received from the MS. In response to the determination, the one or more network elements may arrange for postponement of delivery of a delay-tolerant service to the MS or may arrange for adjustment of one or more of a characteristic of a service provided to the MS and a parameter of a radio communication with the MS, including restoring service to the mobile station when the one or more network elements determine that the MS is operating at a restored power supply charge level. By postponing delivery of a delay-tolerant service to the MS or arranging for adjustment of one or more of a characteristic of a service provided to the MS and a parameter of a radio communication with the MS, the one or more network elements may extend a life of the power supply when a low charge level is detected. On the other hand, when a recharged power supply is detected, the one or more network elements may arrange for a restoration of full services to the MS.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advancall identifiers, solutions to problems, and any element(s) that may cause any benefit, advancall identifiers, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for managing a charge level of a power supply of a mobile station comprising:
   determining, by a network element, that the mobile station is operating at a low power supply charge level; and
   in response to the determination, performing one or more of adjusting a parameter of a radio communication with the mobile station, and instructing the mobile station to acquire an alternative network, communication system, or wireless technology that is different than the current network, communication system, or wireless technology.

2. The method of claim 1, wherein adjusting comprises one or more of changing a technique for managing an active set of the mobile station, operating the mobile station at a different forward error rate, operating the mobile station with different retransmission parameters, selecting a channel for farther communications with the mobile station based on an amount of power consumed for transmission over each such channel, applying resource allocation strategies that minimize power consumption by the mobile station, controlling radio configuration and gating to minimize power consumption by the mobile station, and prohibiting speculative active behavior related to the mobile station.

3. The method of claim 1, wherein one or more of adjusting a parameter of a radio frequency communication with the mobile station and instructing the mobile station to acquire an alternative network is based on one or more of a type of the mobile station, a service subscribed to by the mobile station, and battery characteristics of the mobile station.

4. A Services Battery Manager that resides in a telecommunications network and is configured to determine that a mobile station is operating at a low power supply charge level and, in response to the determination, perform one or more of postponing a service being delivered to the mobile station, adjusting signaling between the mobile station and a network serving the mobile station, delaying a connection of an incoming call by alerting on a common channel and connecting the call only upon acceptance of the call by a target mobile station, disabling a ring tone of the originating mobile station, reducing a quantity of message alerts being delivered to the mobile station, reducing a quantity of call alerts being delivered to the mobile station, queuing and combining one or more call alerts and messages for conveyance to the mobile station in a combined message, speeding up voicemail playback when a user of the mobile station is on the voice channel, automatically reducing an amount of information being delivered to the mobile station with respect to voicemail messages, replacing real-time voice with "voice messaging" increasing an interval between updates for services that require periodic refreshing of information, and instructing the mobile station to acquire an alternative network, communication system, or wireless technology that is different than the current network, communication system, or wireless technology.

5. The Services Battery Manager of claim 4, wherein the Service Battery Manager postpones delivery of a service provided to the mobile station by postponing delivery of one or more of a Short Message Service, an Enhanced Messaging Service, a Multimedia Messaging Service, a push service, a "To Go" service, and an over-the-air delivering of a software update to the mobile station.

6. The Services Battery Manager of claim 4, wherein the Services Battery Manager performs one or more of adjusting a characteristic of a service being delivered to the mobile station and postponing a service being delivered to the mobile station based on one or more of a type of the mobile station, a capability of the mobile station, a service subscribed to by the mobile station, a profile of power consumption of the mobile station, and battery characteristics of the mobile station.

7. An application service comprising the Services Battery Manager of claim 4.

8. A core network element comprising the Services Battery Manager of claim 4.

9. A Radio Battery Manager that resides in a Radio Access portion of a telecommunications network and is configured to self-determine that a mobile station has undergone a change in a charging level, in response to the determination, adjust a parameter of a radio frequency communication with the mobile station.

10. The Radio Battery Manager of claim 9, wherein the Radio Battery Manager adjusts a parameter of a radio frequency communication by one or more of changing a technique for managing an active set of the mobile station, operating the mobile station at a different forward error rate, operating the mobile station with different retransmission parameters, selecting a channel for further communications with the mobile station based on an amount of power consumed for transmission over each such channel, applying resource allocation strategies that minimize power consumption by the mobile station, controlling radio configuration and gating to minimize power consumption by the mobile station, and prohibiting speculative behavior related to the mobile station.

11. The Radio Battery Manager of claim 9, wherein the Radio Battery Manager adjusts a parameter of a radio frequency communication based on one or more of a type of the mobile station, a service subscribed to by the mobile station, and battery characteristics of the mobile station.

12. A Base Station Controller comprising the Battery Manager of the Radio Access portion of the network of claim 9.

13. A Packet Control Function comprising the Battery Manager of the network in claim 9.

14. The method of claim 9 wherein the step of determining that the mobile station has undergone a change in a charging level comprises self-determining by the Radio Battery Manager that the mobile station has undergone a change in a charging level by referencing to at least one timer in the network.

15. A Base Station comprising the Battery Manager of the Radio Access portion of the network of claim 9.

16. A method for managing a charge level of a power supply of a mobile station comprising:
determining, by a network element, that the mobile station is operating at a low power supply charge level; and
in response to the determination, performing one or more of postponing a service being delivered to the mobile station, reducing a quantity of message alerts provided to the mobile station, reducing a quantity of call alerts provided to the mobile station, and queuing and combining one or more call alerts and messages for conveyance to the mobile station in a combined message, speeding up voicemail playback when a user of the mobile station is on the voice channel, automatically reducing an amount of information provided to the mobile station with respect to voicemail messages, replacing real-time voice with "voice messaging", automatically eliminating a video component of a multimedia stream and sending only an audio component, and increasing an interval between updates for services that require periodic refreshing of information.

17. The method of claim 16, wherein postponing delivery of a service comprises postponing delivery of one or more of a Short Messaging Service, an Enhanced Messaging Service, a Multimedia Messaging Service, a push service, a "To Go" service, and an over-the-air provisioning of a software update to the mobile station.

* * * * *